United States Patent [19]

Fratta

[11] Patent Number: 5,053,938

[45] Date of Patent: Oct. 1, 1991

[54] POWER CONVERTER HAVING CONTROL CIRCUITRY FOR THE VOLTAGE SUPPLIED TO THE INVENTER

[76] Inventor: Antonino Fratta, Via Cristalliera 17, 10139 Torino, Italy

[21] Appl. No.: 541,497

[22] Filed: Jun. 21, 1990

[30] Foreign Application Priority Data

Jun. 27, 1989 [IT] Italy .................. 67519 A/89

[51] Int. Cl.$^5$ ............................. H02M 5/45
[52] U.S. Cl. ........................ 363/37; 363/138
[58] Field of Search ............. 363/34, 35, 36, 37, 363/135, 136, 137, 138

[56] References Cited

U.S. PATENT DOCUMENTS

| 3,538,419 | 11/1970 | Seki et al. | 363/136 |
|---|---|---|---|
| 3,872,364 | 3/1975 | Hubner | 363/37 |
| 3,939,387 | 2/1976 | Maeda | 363/34 |
| 4,086,622 | 4/1978 | Vukasovic | 363/37 |
| 4,236,201 | 11/1980 | Okado et al. | 363/138 |
| 4,309,751 | 1/1982 | Okado | 363/138 |
| 4,403,280 | 9/1983 | Okado | 363/138 |
| 4,506,319 | 3/1985 | Akamatsu | 363/138 |
| 4,567,420 | 1/1986 | Beck | 363/138 |
| 4,965,709 | 10/1990 | Ngo | 363/137 |

Primary Examiner—Steven L. Stephan
Assistant Examiner—Jeffrey L. Sterrett
Attorney, Agent, or Firm—Young & Thompson

[57] ABSTRACT

A converter of the electric energy fed by a unidirectional voltage source, comprising a voltage inverter circuit arranged to deliver an alternating voltage, possibly polyphase, to an inductive load such as an electric motor, wherein between the energy source and the voltage inverter circuit there is inserted a set of components arranged for controlling in an active manner the supply voltage of the inverter circuit, limiting the maximum value of the voltage applied thereto and assisting the commutation by transitorily bringing to zero (or to a negative value) the supply voltage applied to the inverter circuit during the periods of time in which any commutation should be carried out therein. This set of components includes a capacitor connected, through a diode, in parallel to the unidirectional voltage source, a first controlled switch inserted in parallel to the diode, and a second controlled switch inserted in parallel to the inverter circuit input.

9 Claims, 3 Drawing Sheets

POWER CONVERTER HAVING CONTROL CIRCUITRY FOR THE VOLTAGE SUPPLIED TO THE INVENTER

BACKGROUND OF THE INVENTION

This invention relates to an electric energy power converter comprising a unidirectional voltage source and a voltage inverter circuit arranged to convert said unidirectional voltage into an alternative voltage, possibly polyphase, intended to supply an inductive load, such as an electric motor.

In their industrial utilization, the electric energy power converters are mainly used for the supply of inductive loads such as electric motors. Presently it is of maximum interest to supply the electric motors by alternating current. Taking into consideration the voltage supplied circuits, the generation of the alternating voltages intended to supply the electric motors is obtained by modulating and inverting a direct supply voltage (or a unidirectional voltage, namely a voltage having a non-null medium value and always the same direction), which on its turn is usually obtained by converting an alternating voltage.

FIG. 1 of the accompany drawings shows the principle circuit diagram for generating variable three-phase alternating voltages applied to an inductive load such as an electric motor ME, starting from a source E t of a unidirectional volta $v_{bus}$. The inverter INV is formed by a number of so-called "legs", equal to the number of phases to be generated, and therefore there are three legs G1, G2, G3 for a three-phase inverter. Each leg of the inverter is embodied by using valves formed by semiconductors which perform the ideal function of a bidirectional switch, although the components per se are unidirectional such as diodes and transistors, and it is controlled by a control circuit which imposes the transistor commutations (forced switching). The control circuit is CC.

FIG. 2 shows a typical embodiment of an inverter leg using two transistors $T+$, $T-$ and two recirculation diodes $D+$, $D-$. By disregarding the voltage drops across the semiconductors, the voltage $v_u$ applied to the load may have only two instant values, namely O or $v_{bus}$, irrespective of the direction (sign) of current $i_u$ which passes through the load, which we will consider as positive when it is directed according to the arrow shown in FIG. 2. When $i_u$ is positive, $T+$ should be conducting in order to have $v_u = v_{bus}$, otherwise $v_u = O$ due to the conduction through the recirculation diode $D-$. Therefore, by adequately operating transistor $T+$, the mean value of the output voltage $v_u$ may be controlled at will between O and $V_{bus}$, by modulating the periods of duration of the two instant values O and $v_{bus}$, with a commutation frequency suitably high in order to limit the current waves produced by the two-values wave form of voltage $v_u$.

The technological problems posed by the embodiment of such an inverter circuit with forced switching are due to the high commutation frequency (typically more than 1 kHz), because to each commutation of the output voltage correspond a higher energy to be dissipated and a heavier electrical stress of the semiconductors. The energy lost by the commutation during a complete period, multiplied by the commutation frequency, gives a mean value of lost power, which imposes a limit to the maximum allowable commutation frequency; often, the commutation frequency is chosen by a compromise, by sharing out the conduction dissipation and the commutation dissipation.

Moreover, the electric stress which arises during the commutation imposes a poor exploitation of the components, in order to ensure the circuit a suitable reliability. FIG. 3 shows a typical locus v-i (diagram voltage-current) for a transistor used in a circuit with forced switching. The area S wherein the operation is reliable is ideally determined by the maximum voltage $V_{max}$ and by the maximum current $I_{max}$ which the transistor may withstand; Ap indicates the opening condition of the transistor and Co the conduction state thereof; line 1 is the diagram of the operating conditions of the transistor during a transition from conduction to opening, and line 2 is the diagram of the operating conditions of the transistor during a transition from opening to conduction. It may be remarked that, in order that the instant operating conditions are always contained within the area S, wherein the operating conditions are reliable, the maximum voltage $V_A$ which may be applied to the transistor during the opening thereof is noticeably lower than $V_{max}$, and the maximum current $I_c$ which may pass through the transistor during the conduction thereof is noticeably lower than $I_{max}$.

In addition to the above, in the case of short circuit on the load it is likely that the current limits of the transistors are overcome, and advanced systems for diagnostics and real time intervention are needed in order to prevent such a case.

In any event, the simultaneous existence of the three above factors imposes a very poor exploitation of the semiconductors, or, alternatively, a dangerous vulnerability of the circuit with respect to the fault and/or the transitory overcharge conditions should be accepted.

Different circuit configurations are known, which aid the semiconductors during the commutations, but these solutions need reactive bipoles, with the consequent encumbrances and costs, and complicated modulation algorithms; however, they do not qualitatively solve the problem, namely they do not allow a better exploitation of the semiconductors.

Moreover, the forced switching circuits do not allow use of thyristors, which are more sturdy than the transistors with respect to the operation in the conduction and opening statuses, but are able to compute from the conduction to the opening only in the absence of a current flowing through them.

A kind of inverter circuit, well different from the forced switching circuit pointed out above, is offered by the "resonant bus" technique, according to which the supply volt $v_{bus}$ applied to the inverter is a high frequency voltage oscillation (which is unidirectional for the power applications), obtained by means of a L-C resonator having a prevailing power. FIG. 4 shows the principle diagram of a power converter with resonant bus, supplied by a direct voltage source E, with a series resonant circuit L-C and a non-null mean voltage. In this case the legs of the inverter INV are free from commutation problems, because at each oscillation period the voltage $v_{bus}$ passes by zero; by suitably choosing the time intervals for doing the commutations, there is on the semiconductors no excessive stress. In such a kind of circuit the use of the gate turnoff thyristors (GTO) is allowed, but even in such a circuit the usual thyristors may not be used, except by adding further circuits.

The sole problem posed by the valves of a resonant bus inverter attains to- the scarce exploitation with respect to the voltage, because in general the peak voltage value to which the valves are subjected is equal or more than twice the mean supply voltage, which is useful for the power generation. This is clarified by FIG. 5, which shows (in a manner similar to FIG. 3) a typical locus v-i for a power valve used in a resonant bus inverter. It is to be remarked that the peak voltage value $V_{pk}$ is twice the mean voltage $V_{out}$, useful for the power generation. Therefore, even in this case, there is a noticeable under-exploitation of the semiconductors.

However the characteristic and heavier problems of a resonant bus inverter are posed by the dimensioning of the power resonator L-C and by the drive and control techniques relating thereto, which are put into effect by means of special power circuits, diagrammatically shown in FIG. 4 by the blocks SW1 and SW2. Some improvements to the condition of poor exploitation of the semiconductors may be attained only through further circuit complications in blocks SW1 and SW2.

SUMMARY OF THE INVENTION

In the above circumstances of the known state of art, the object of this invention is to improve the power electric energy converters, especially for the supply of electric motors, in order to allow attaining one or more of the following advantages: to gain the maximum exploitation of the semiconductors forming the inverter circuit; to gain the maximum reliability and protectability of the system; to allow use of thyristors instead of transistors; to avoid or reduce the need for advanced drive circuits and protection techniques in order to defend the circuit against fault conditions.

This object is attained, according to the invention, in that between the unidirectional electric energy source and the voltage inverter circuit there is inserted in parallel a system of components intended for controlling, in an active and time unconditional manner, the supply voltage of the voltage inverter circuit, in the sense, on one hand, of limiting the maximum value of the voltage applied to the inverter circuit, and on the other hand of assisting the commutation by temporarily zeroing (or by rendering temporarily negative) the supply voltage applied to the inverter circuit, at least during the time periods wherein some commutations should be effected within the inverter circuit.

More specifically, said system of components comprises a capacitor connected, through a diode, in parallel to the unidirectional electric voltage source, a first controlled switch element inserted in parallel to said diode, and a second controlled switch element inserted in a parallel circuit at the input of the inverter circuit.

BRIEF DESCRIPTION OF THE DRAWINGS

These and other characteristics and advantages of the subject of this invention will appear more clearly from the following description of some embodiments, which are diagrammatically shown, along with some representations intended to clarify the former state of art, in the appended drawings, wherein.

DETAILED DESCRIPTION OF THE PREFERRED EMBODIMENTS

Figure 1:
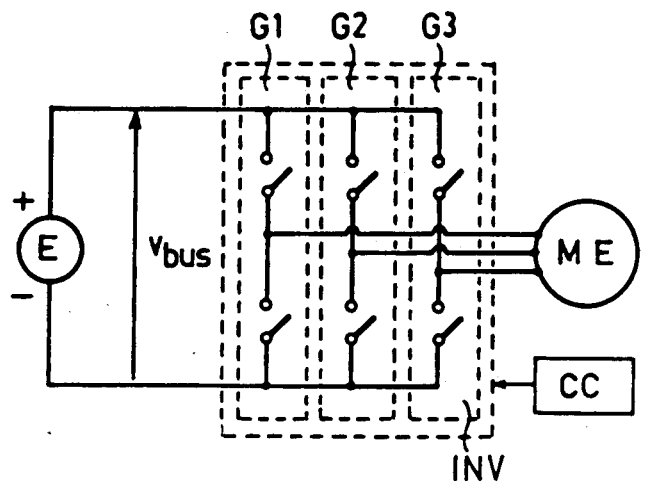
FIG. 1 is the principle diagram (already discussed) of a circuit for the generation of alternative three-phase variable voltages applied to an inductive load.
Figure 2:
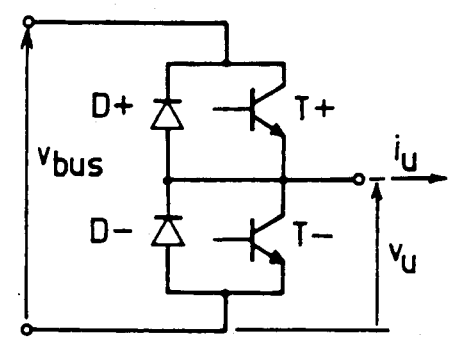
FIG. 2 shows a typical embodiment (already discussed) of an inverter circuit leg using transistors and recirculation diodes.
Figure 3:
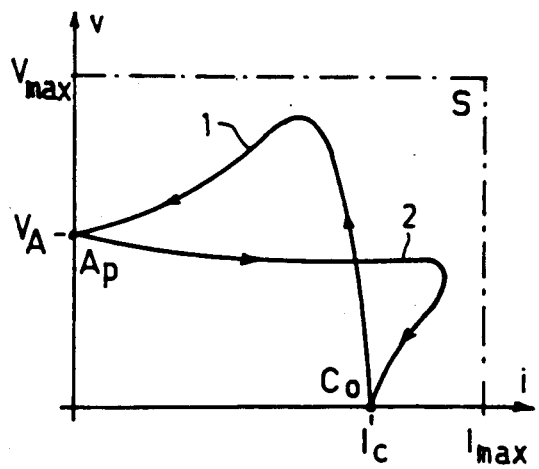
FIG. 3 shows a typical v-i locus (already discussed) for a transistor inserted in a forced switching inverter circuit.
Figure 5:
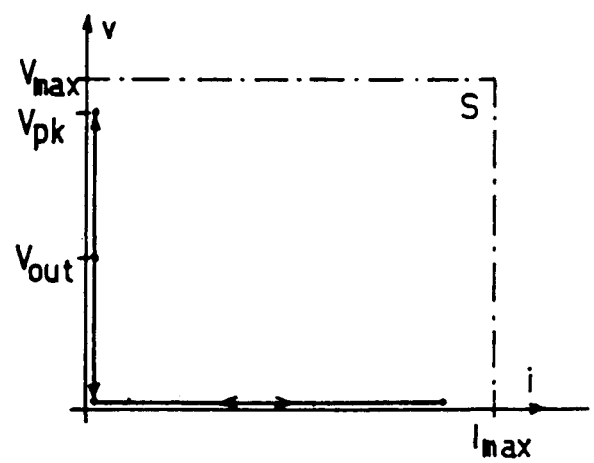
FIG. 5 shows a typical v-i locus (already discussed) for a power valve inserted in a resonant bus inverter circuit.
Figure 4:
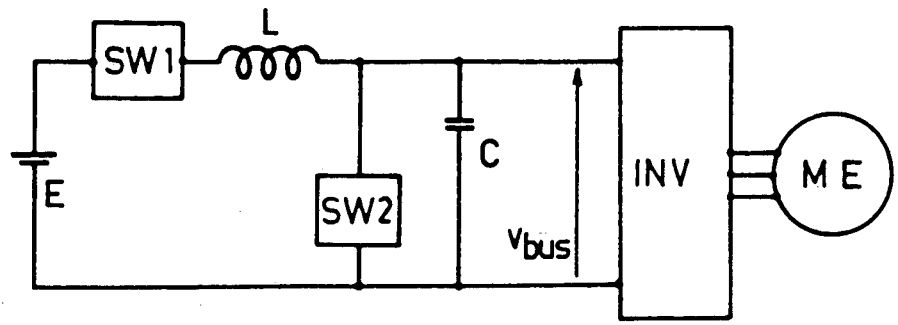
FIG. 4 shows the principle diagram (already discussed) of a resonant bus power converter.
Figure 6:
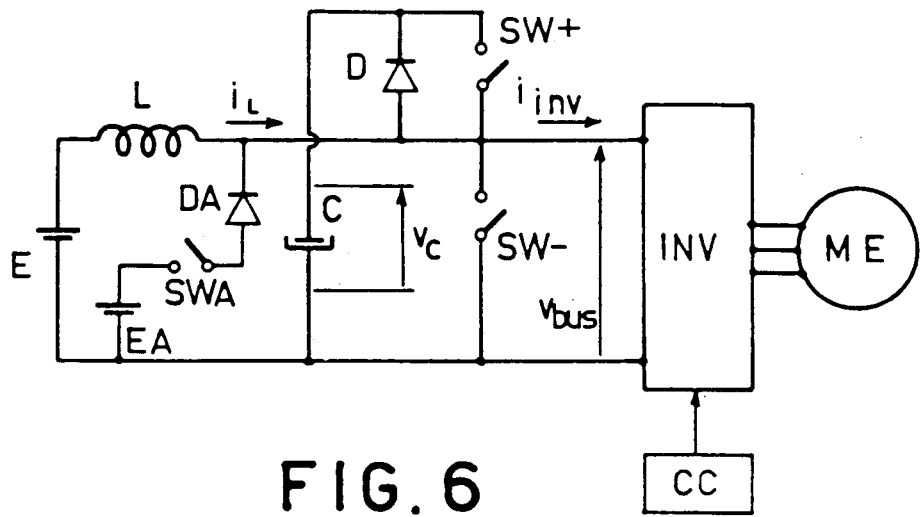
FIG. 6 shows the basic diagram of a power inverter circuit according to the present invention.

In FIG. 6 there is diagrammatically shown a power converter circuit according to the invention, wherein the inverter circuit INV (which controls an electric motor ME) is supplied by a direct voltage source E; the supply circuit includes an inductor L. This circuit will first be described by neglecting the components EA, DA and SWA, which will be discussed later on. Between the supply voltage source E and the inverter INV there is inserted a system of components which includes a capacitor C connected in parallel to the supply voltage source E through a diode D, a first controlled switch element SW+ inserted in parallel to said diode D, and a second controlled switch element SW− inserted in parallel at the input of the inverter circuit INV. This system of components represents the first essential characteristic of the invention, and it has the purpose of controlling in an active manner the voltage $v_{bus}$ at the input of inverter INV between two values O and $v_c$, whereas the mean value of this voltage remains equal to the supply voltage E.

The purpose of capacitor C is, on one hand, to take up (through the diode D) the excess of the supply voltage E with respect to the charge voltage $v_c$ of the capacitor. This means that, by controlling the circuits in order to keep within a pre-established maximum level the charge voltage of capacitor C, there is reliably avoided the application of any noticeably higher voltage to the inverter circuit. Another purpose of capacitor C is, on the other hand, to temporarily provide for the requests for the current $i_{inv}$ taken up by the inverter circuit, which overcome the current $i_L$ delivered by the supply source. This takes place by the intervention of the controlled switch element SW+, whose operation consists in that, when conducting, it allows a part of the electric energy accumulated in capacitor C to flow towards the inverter circuit INV.

The purpose of the controlled switch element SW− is to provide for a momentary short circuit at the input ends of inverter circuit INV, thus zeroing the voltage $v_{bus}$ applied thereto.

Therefore, to obtain that $v_{bus}=0$ it is enough to open SW+, or close SW−, according to the positive or negative sign of the differential current ($i_L − t_{inv}$). When the condition $v_{bus}=0$ is verified, the inverter valves may be commutated without any stress. Moreover, the period of time during which the condition $v_{bus}=0$ persists may be actively administered in order to further optimize the commutation. In any event this period of time is always very short, and during the remaining period of time the voltage applied to the inverter circuit input is $v_{bus}=v_c$, a condition which is obtained by opening SW−, and if needed also by closing SW+, according to the instant value of $(i_L-i_{inv})$. As a consequence, E is only little lower than $v_c$, and this is important because $v_c$ represents the maximum voltage stress on the inverter valves, and the voltage E, which produces the power, is not noticeably lower with respect thereto. Practically, therefore, the exploitation of the inverter semiconductors is the maximum possible one.

By the application of the invention, all dimensioning problems are displaced onto the controlled switches SW+ and SW−, in a manner depending upon the dimensioning of L and C.

With reference to SW−, in the operative conditions it should sustain the commutations when the differential current $(i_L-i_{inv})$ is positive; since the conduction has a short duration (for example from 5 to 10 microseconds) the power dissipated by conduction is practically negligible. The dimensioning of L affects above all the opening commutation of SW−; if L has a reduced value, the current increase during the conduction period of SW− may be high, thus increasing the dissipation at the opening commutation with respect to the minimum needed for the operation (which would be obtained when L approaches the infinity).

With reference to SW+, in the operative conditions it should sustain the commutations when the differential current $(i_L-i_{inv})$ is negative; the conduction may be considerable because SW+ conducts during extended periods of time (nearly always); but in the reality the actual period of conduction of SW+ is very lesser, because the mean value of $(i_L-i_{inv})$ should be null; during all the remaining period of time the current $(i_L-i_{inv})$ has a positive sign, and then the conduction affects the diode D. It may be demonstrated that the more high is the differential current $(i_L-i_{inv})$ with respect to any one of its components, the less is the duration of the conduction period of SW+.

As it may be understood from the above, and particularly by considering FIG. 6, the switch elements SW+ and SW− should be controlled in accurate manner in order to force the commutations. Therefore, advanced drive circuits are needed for their control, and auxiliary commutation circuits may be of use, in a manner similar to which is known to the former state of art for the drive of the inverter circuit valves. On the contrary, by the application of the invention such a need does not exist for the inverter valves, which are completely free from commutation problems. Since the number of the inverter valves is greater than the number (two) of controlled switch elements according to the invention, it is possible to obtain a more economical and less dissipative complete conversion structure, notwithstanding the seeming circuit complication introduced by the presence of a structure for active control of the direct current supply.

Some considerations about the protectability of a converter according to the invention will now be developed. The fault condition to be mainly taken into consideration is that of short circuit on the load. In such a case, a circuit according to FIG. 6 may show problems only in the case of SW+ conducting. It is therefore ceded to provide SW+ with a real time protection against overcurrent, namely with an advanced and complicated drive circuit, substantially according to the known techniques. After opening of SW+ it is possible to close SW− and then to open the inverter valves in order to cancel the effects of the short circuit on the load. Thereafter, by reopening SW−, the transitory period of short circuit overcurrent, induced in L, becomes exhausted.

In the case of a fault (short circuit) on an inverter valve, the process is completely similar to the above one referred to the short circuit on the load. In the case of a fault (short circuit) on both valves of the same inverter leg, the protection against overcurrent in L may be obtained by means of fuses and/or magnetothermic switches inserted in series with L, and the dimensioning of these protection apparatuses is made easier by the presence of L, which limits the value of the fault current derivative.

The diagram according to FIG. 6, which is the basic diagram of a power inverter circuit according to the invention, may be improved in a simple manner in order to reduce the commutation losses and to render more easy the converter protection. This is done by adding a voltage source EA, which supplies a voltage low with respect to the operation voltage of the circuit, and a diode DA forming a group with said low voltage source EA; a switch SWA allows inserting said group EA-DA in parallel to the second controlled switch element SW−.

The group formed by the components EA, DA and SWA is put in operation, by closing SWA before closing SW+, each time the volta $v_{bus}$, after having been zeroed by action of SW−, should be brought again to its maximum value. Then take place the following three steps:

First step: When closing SWA, the application of a low positive voltage (for example 10 volts) causes the direct polarization of SW− and all valves included in the active legs of inverter INV to be restored. This takes place with a very reduced energy consumption, due to the low value of voltage EA.

Second step: When said direct polarization has been obtained up to the voltage EA, the circumstances may be possibly tested by suitable signal circuits in order to allow further operation only if the polarization has been correctly established, by otherwise blocking the operation.

Third step: SW+ may finally be closed again, and the entire voltage Vc as well as the entire power are delivered to the inverter, without the entire voltage being used, as usual, with a great energy loss, for the socalled "recovery", namely for neutralizing the charges accumulated within the components which were formerly at a very low voltage.

This way the commutation losses are reduced to a great extent, and at the same time the protection against overcharges is extended to the controlled switch element SW− too, thus allowing simplifying its protection circuits. Of course some circuits are how needed in order to protect SWA, but such circuits are of easy and simple embodiment in view of the low value of voltage EA, and therefore of the reduced energy involved. These protection circuits could even be simply dissipative ones.

It should now be remarked that the group of components DA, EA, SWA may be used in addition to any of the circuits which will be described later on, in order to gain the stated advantages.

As already said, one of the objects of this invention is to allow the use of thyristors instead of transistors in a forced switch converter. The thyristors are not able to force the commutation, and therefore in order to open such a component it is needed to first zero the conducted current, to wait for a certain time, and then to apply again the voltage at the ends of the component. This cannot be done by means of the basic diagram according to FIG. 6. However, through a further improvement of the basic diagram of FIG. 6 the stated purpose may be attained in an active manner according to principles of the invention.

Figure 7:
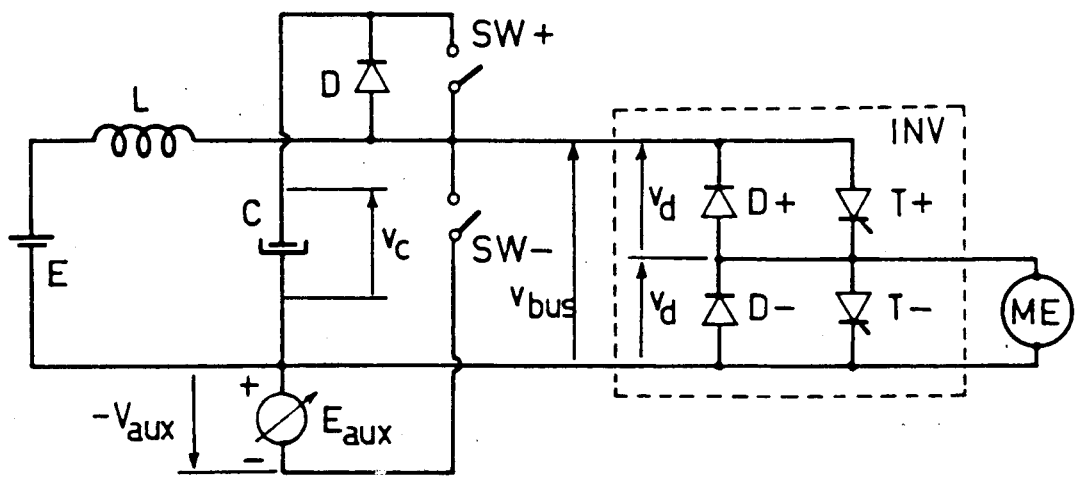
FIG. 7 shows a modification to the diagram according to FIG. 6, intended to allow the use of thyristors.

The diagram, modified to this aim, is shown by FIG. 7, where it is limited to a sole phase of the alternate current delivered. It involves introducing an auxiliary voltage, produced by an adequately controlled voltage source $E_{aux}$. The auxiliary voltage $v_{aux}$ is suitable for producing the natural commutation of the thyristors. In order to thyristors $T+$, $T-$, each having a diode $D+$, $D-$ connected in antiparallel thereto, it is needed that the voltage applied to the thyristors is brought to an inverted value, even if reduced. With reference to FIG. 7, this corresponds to the application to the inverter circuit of a voltage $v_{bus} = -b\ v_d$, where $v_d$ represents the voltage drop of a diode conduction, and $v_{bus}$ is a factor equal to or greater than 1. But, in order that volta $v_{bus}$ becomes negative when $SW-$ is brought to conduction, it is needed that $SW-$ has the negative end connected to a negative potential, $-v_{aux}$ according to FIG. 7, which should also compensate for the conduction voltage drop $v_{on}$ of the switch element $SW-$. Therefore it should be $-v_{aux} + v_{on} = -b\ v_d$, and $v_{aux} = b\ v_d + v_{on}$.

The dimensioning of $v_{aux}$ should be effected accurately, because even little errors of excess voltage give rise to high currents through the diodes connected in antiparallel to the thyristors, whilst even little errors in shortage may prevent the correct thyristor turnoff. In effect, a safe turnoff is obtained when $v_{bus}$ takes a value equal to or lower than $-v_d$. Therefore the value of $v_{bus}$, during the commutation periods, should be included between the values $-2\ v_d$ and $-v_d$. As a consequence, the factor b of the preceding paragraph should be comprised between 1 and 2.

The voltage $v_{aux}$ may be obtained by means of low voltage circuits controlled in order that $v_{bus}$ is driven according to the stated requisite. For example, in order to attain the above function, a commutation circuit supplied by a modulated low voltage may be used.

Until now it has been supposed that the converter was fed by unidirectional current, but in the industrial electronics it is of actual interest to supply electric motors by a three-phase power taken from a three-phase network, whose frequency is in- general from 50 to 60 Hz. The invention is particularly suitable for such an application, even and particularly when the recuperation onto the network of the mechanical energy is required.

Figure 8:
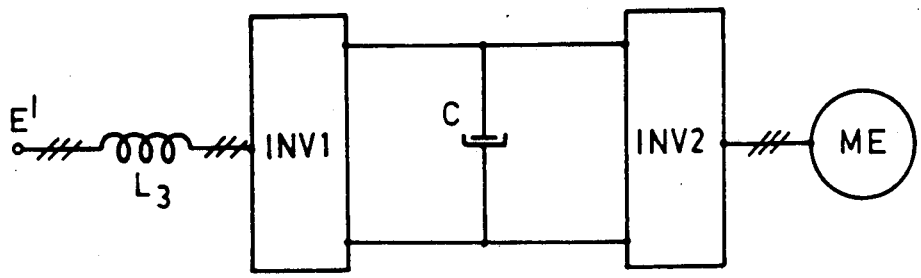
FIG. 8 shows the basic diagram of a power converter from three-phase current to three-phase current, according to the known state of art.

According to the former state of the art relating to the voltage inverters, this is obtained by means of two inverters, INV1 directed towards the network and INV2 directed towards the load, coupled together by direct current with the addition of filtering capacitors and with a three-phase inductor $L_3$ directed towards the supply network, as shown by the diagram of FIG. 8. In such a converter, all valves included in both inverters show the problems pointed out in the introduction.

Figure 9:
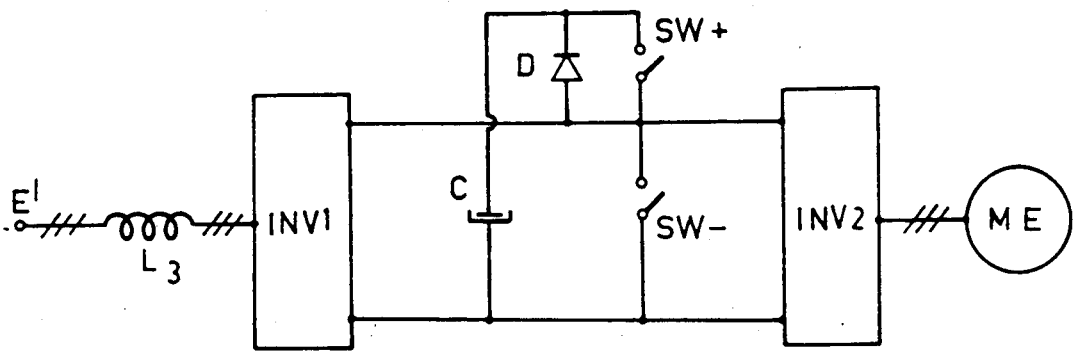
FIG. 9 shows how the diagram according to FIG. 8 should be modified in order to apply therein the principle of this invention.

In the application of this invention, it is possible to assist both inverters by means of a single system of components forming a commutation assisting structure, whereby the inverters may be dimensioned for the conduction only. The corresponding diagram is shown in FIG. 9. mains the same which has been clarified with reference to the former embodiments and, as it will be understood, its effects extend non only to the inverter INV2 directed towards the load, but even to the inverter INV1 directed towards the network. Therefore, in this case, the advantages resulting from the application of the invention are multiplied.

Figure 10:
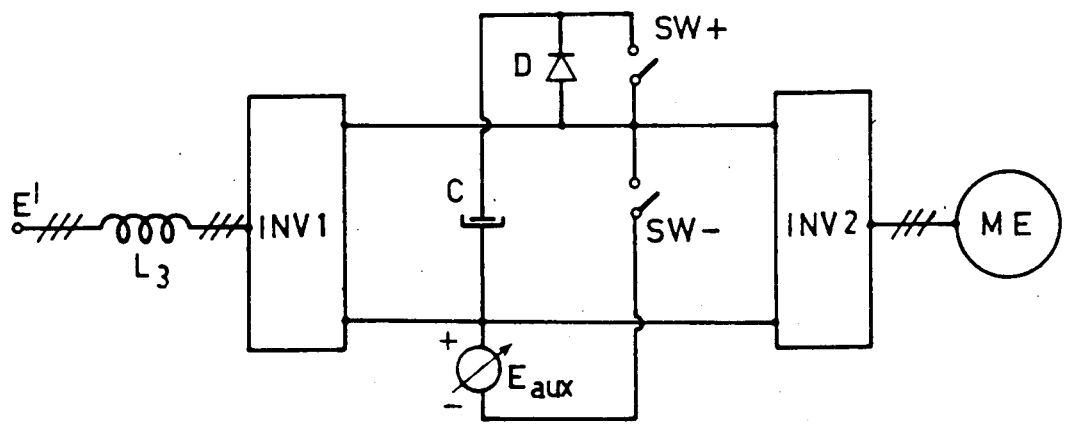
FIG. 10 shows a modification to the diagram according to FIG. 9, intended to allow the use of thyristors.

Of course, also in this case the use of thyristors instead of the transistors, as valves inserted in the inverters, is allowed when the system of components shown in FIG. 9 is modified in a manner similar to that stated with reference to FIG. 7, as it is shown in FIG. 10. Moreover a group of components DA, EA, SWA according to FIG. 6 could be added in order to reduce the commutation losses.

It should be pointed out that the characteristic operation of the controlled switch elements $SW+$ and $SW-$ according to the invention, intended to assist the commutation of the valves inserted in the inverters, may be carried out on request, namely by intervening each time a commutation operation of the inverter circuits is ordered by the control circuits, or even said operation may be effected with a controlled clock rate, at an adequately high frequency, and in such a case each ordered commutation is kept in suspense until the moment in which a condition favorable for the commutation appears.

It is therefore clear that the application of this invention allows a considerably simpler and economical dimensioning of a power converter, without jeopardizing or even by improving its conditions of reliability and protectability.

It is to be understood that, although specific embodiments of the invention have been described, the invention is not limited thereto. Any complementary fitting, not described because not necessary for the comprehension of the invention, may be added; the invention may be adopted in any application similar to that pointed out, or having similar requirements, and different modifications as well as all replacements by technically equivalent means may be made to what has been described and shown, without departing from the spirit of the invention and the scope of this Patent.

I claim:

1. An electric energy power converter comprising an electric energy source which supplies a unidirectional voltage, and a voltage inverter circuit arranged to convert said unidirectional voltage into an alternate voltage intended to supply an inductive load, and further comprising a system of components inserted in parallel between said unidirectional electric energy source and said voltage inverter circuit, said system of components being adapted to control, in an active and time unconditional manner, the voltage supplied by said source to said voltage inverter circuit, in the sense of limiting the maximum value of the voltage applied to said inverter circuit, and of assisting the commutation by temporarily rendering non-positive the voltage supplied by said source to said inverter circuit, at least during the periods of time in which some commutations should be effected within the inverter circuit, wherein said system of components comprises a capacitor and a diode connected in series and together connected in parallel to said unidirectional electric energy source, a first controlled switch element inserted in parallel to said diode, and a second controlled switch element inserted in parallel at the input of said inverter circuit.

2. The converter as set forth in claim 1, wherein said system of components further comprises an auxiliary voltage source connected in series with said second controlled switch element.

3. A converter as set forth in claim 1, wherein said system of components further comprises a group including a low voltage source, which supplies a voltage low with respect to the voltage of said unidirectional electric energy source, an auxiliary diode and an auxiliary switch connected in series with said low voltage source, said group being connected in parallel to said second controlled switch element.

4. A converter as set forth in claim 1, wherein said inverter circuit includes thyristors and recirculation diodes inserted in antiparallel to said thyristors, and wherein said system of components further comprises an auxiliary source of negative voltage, connected in series with said second controlled switch element.

5. A converter as set forth in claim 4, wherein said auxiliary source of negative voltage is controlled in order to supply a voltage whose absolute value is higher than the conduction voltage drop of one of the recirculation diodes included in said inverter circuit, whereby a safe turnoff condition of the thyristors is obtained.

6. A converter as set forth in claim 5, wherein said auxiliary source of negative voltage is controlled in order to supply a voltage close to the sum of the conduction voltage drop of said second controlled switch element and the conduction voltage drop of one of said recirculation diodes included in said inverter circuit, multiplied by a factor comprised between 1 and 2.

7. A converter as set forth in claim 1, wherein said inverter circuit is directed towards the load, said unidirectional source of electric energy comprises a second inverter circuit directed towards a supply network and fed by the alternate current of said supply network, and has an inductor directed towards said supply network, and wherein said second inverter circuit directed towards the supply network is assisted, in its commutation, by the same system of components intended to assist the commutation of said inverter circuit directed towards the load.

8. A converter as set forth in claim 7, which is substantially free from any inductive element inserted between said second inverter circuit directed towards the network and said inverter circuit directed towards the load.

9. A converter as set forth in claim 1, wherein said controlled switch elements are driven in order to intervene on request each time said system of components has ordered at least one commutation.

* * * * *

UNITED STATES PATENT AND TRADEMARK OFFICE
CERTIFICATE OF CORRECTION

PATENT NO. : 5,053,938
DATED : October 1, 1991
INVENTOR(S) : Antonino FRATTA

It is certified that error appears in the above—identified patent and that said Letters Patent is hereby corrected as shown below:

In the title, change "INVENTER" to --INVERTER--.

Signed and Sealed this

Twelfth Day of January, 1993

Attest:

DOUGLAS B. COMER

*Attesting Officer*   *Acting Commissioner of Patents and Trademarks*